United States Patent [19]
Tatsuno

[11] Patent Number: 5,651,478
[45] Date of Patent: Jul. 29, 1997

[54] OIL-FEEDING APPARATUS

[75] Inventor: Hiyoshi Tatsuno, Tokyo, Japan

[73] Assignee: Tatsuno Corporation, Tokyo, Japan

[21] Appl. No.: 516,330

[22] Filed: Aug. 17, 1995

[30] Foreign Application Priority Data

Aug. 31, 1994 [JP] Japan ...................... 6-228997

[51] Int. Cl.⁶ ...................................... B67D 5/22
[52] U.S. Cl. ............................ 222/25; 222/71; 222/75; 222/135
[58] Field of Search ................... 222/25, 71, 74, 222/75, 135, 527, 529; 239/302

[56] References Cited

U.S. PATENT DOCUMENTS

| | | | |
|---|---|---|---|
| 4,131,218 | 12/1978 | Tatsuno | 222/527 |
| 4,195,674 | 4/1980 | Madden | 222/74 X |
| 4,611,729 | 9/1986 | Gerstenmaier et al. | 222/75 |
| 5,018,645 | 5/1991 | Zinsmeyer | 222/71 |
| 5,163,586 | 11/1992 | Zinsmeyer | 222/71 X |
| 5,452,750 | 9/1995 | Miller et al. | 222/75 X |

FOREIGN PATENT DOCUMENTS 52-26008  2/1977  Japan.
4128198  4/1992  Japan.

Primary Examiner—Joseph Kaufman
Attorney, Agent, or Firm—Birch, Stewart, Kolasch & Birch, LLP

[57] ABSTRACT

An oil-feeding apparatus of the present invention includes a main body housing containing oil-feeding pumps and flow meters therein. An indicator housing is placed on the main body housing with supplied oil amount indicators, and a strut is stood at one side of the main body housing. A top housing has one end connected to the top of the strut, and the other end extended to a part above the main body housing. A hose guide is provided between the main body housing and the top housing, which guide oil-feeding hoses, each with an oil-feeding nozzle at a free end thereof, the other end being connected to a discharge pipe provided at the outlet side of the flow meter at a lower part of the hose guide. Retractors are provided in the top housing with wires drawn from the retractors. The midportion of each of the hoses is joined to the wire so as to be suspended in an inverted U-shape in the hose guide. Nozzle rests are provided on the main body housing for hanging the oil-feeding nozzles on the free ends of the oil-feeding hoses.

9 Claims, 3 Drawing Sheets

OIL-FEEDING APPARATUS

BACKGROUND OF THE INVENTION

1. Field of the Invention

The present invention relates to an oil-feeding apparatus to be installed at an oil station for feeding fuel to automobiles and the like.

2. Statement of the Prior Art

Conventional oil-feeding apparatus of on-the-ground installation type comprises a main-body housing and oil-feeding hoses which are drawn therefrom. When oil is fed by use of the this type of oil-feeding apparatus, it is necessary to reduce the weight of the oil-feeding hose, which is applied to hands holding an oil-feeding nozzle provided at the free end of the oil-feeding hose, and attention has to be paid to the hoses not to be damaged or spoiled with the midportion thereof coming in contact with the ground.

For instance, Japanese Laid-Open Patent Application 4-128198 discloses an oil feeding apparatus in which a strut is stood at a side part of a main body housing. An oil-feeding hose of the above apparatus is supported with the midportion thereof suspended on the upper part of the strut in order to support the weight of the oil-feeding hose at this midportion. Moreover, Japanese Laid-Open Patent Application 52-26008 discloses an oil-feeding apparatus comprising a support unit for elastically supporting an oil-feeding hose by being rolled upward by means of an elastic support. Refer, also, to U.S. Pat. No 4,131,218.

However, it is sometimes hard to operate the conventional oil-feeding apparatus in which the oil-feeding hoses are supported with the midportion thereof suspended at the upper part of the strut, when a plurality of oil-feeding hoses are arranged side-by-side for feeding two or more kinds of oils, since the oil-feeding hoses which are adjacent each other are brought into contact or entangled. Moreover, in the case of using the apparatus in which the oil-feeding hose is elastically supported by being rolled upward by means of the elastic support, there is the risk that the oil-feeding hose and the side wall are damaged by the hose which tends to go too far beyond the initial position, owing to the restoring force of the elastic support, when the oil-feeding hose is brought back.

SUMMARY OF THE INVENTION

It is therefore an object of the present invention to provide an oil-feeding apparatus of which oil-feeding hoses are easily handled even when a plurality of oil-feeding hoses are arranged side-by-side, and are smoothly brought back to the initial state.

The object of the present invention can be attained by an oil feeding apparatus including a main body housing containing oil-feeding pumps and flow meters therein; and an indicator housing placed on the main body housing having supplied oil amount indicators; a strut stood at one side of the main body housing; a top housing with one end connected to the top of the strut, and the other edge extended to a part above the main body housing; a hose guide provided between the main body housing and the top housing; oil-feeding hoses, each with an oil-feeding nozzle at a free end thereof, the other end being connected to a discharge pipe provided at the outlet side of the flow meter at a lower part of the hose guide; retractors provided in the top housing; wires drawn from the retractors, the midportion of each of the hoses being fastened by means of the wire so as to be suspended in the inverted U-shape in the hose guide; and nozzle rests provided on the main body housing for hanging the oil-feeding nozzles on the tips of the oil-feeding hoses.

It is preferable that the oil-feeding hoses be provided at the both sides of the main body housing, and that the supplied oil amount indicators be provided at both sides, one for one side of the indicator housing which is provided on the main body housing, so that the oil-feeding area is effectively utilized and the supplied oil amount indicators require merely a single housing.

The oil-feeding apparatus according to the present invention is advantageously employed when three hoses are provided respectively for high-octane or premium gasoline, regular gasoline and diesel oil on each side of the apparatus, whereby it becomes possible to supply a plurality of kinds of oils by using a single oil-feeding apparatus.

Moreover, it is desirable that the lighting unit for lighting up the oil-feeding area be provided at the extended part of the top housing which extends toward the part above the main body housing, so that the oil-feeding area is preferably lit up.

Pilot lamps for indicating "in use" may preferably be provided at potions on the side surfaces of the top housing above the hose guides, so as to respectively correspond to the oil-feeding hoses. This is advantageous because the kind of oil, which is being supplied, can be confirmed.

In the hose guide, it is preferable to provide a partition plate made of punched metal for dividing the area above the main body housing into two sides, so that the opposite side can favorably be seen through and the wind pressure can be reduced.

It is also preferable that the both sides of the main body housing be made by mirror plates, from the viewpoint of increasing a reflecting effect.

In the present invention, the strut is stood at one side of the main body housing. The strut preferably has a side plate on which a display for indicating dealing products such as "PREMIUM", "REGULAR" and "DIESEL" is provided. The top housing is attached to the strut with one end of the top housing being in contact with the upper edge of the strut. The other end of the top housing is extended to the area above the main body housing. The hose guide is provided between the main body housing and the top housing. Each of the oil-feeding hoses is connected to a discharge pipe provided at the outlet side of the flow meter at the lower part of the hose guide, and the midportion of the hose is fastened to a wire which is drawn from a retractor provided inside of the top housing. Accordingly, the oil-feeding hoses are suspended in the hose guide to form the inverted U-shape.

By the above-mentioned structure of the oil-feeding apparatus of the present invention, the hoses can be easily handled by being smoothly taken in and out with the guidance of the hose guide, and brought back to the initial state, even when a plurality of oil-feeding hoses are placed side-by-side.

Other features of this invention will become apparent in the course of the following description of exemplary embodiments, which are given for illustration of the invention and are not intended to be limiting thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
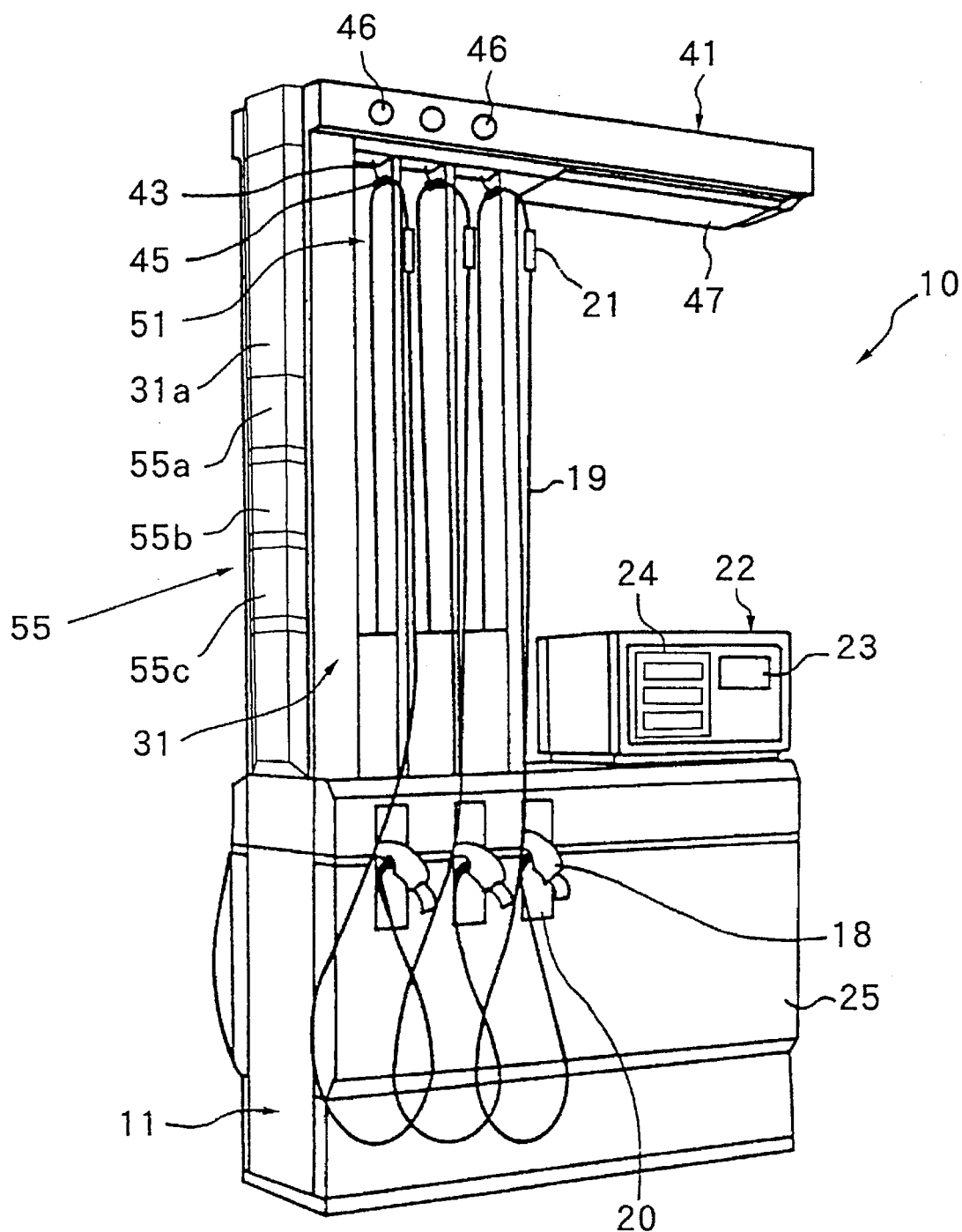
FIG. 1 is an external perspective view of an embodiment of an oil-feeding apparatus according to the present invention.
Figure 2:
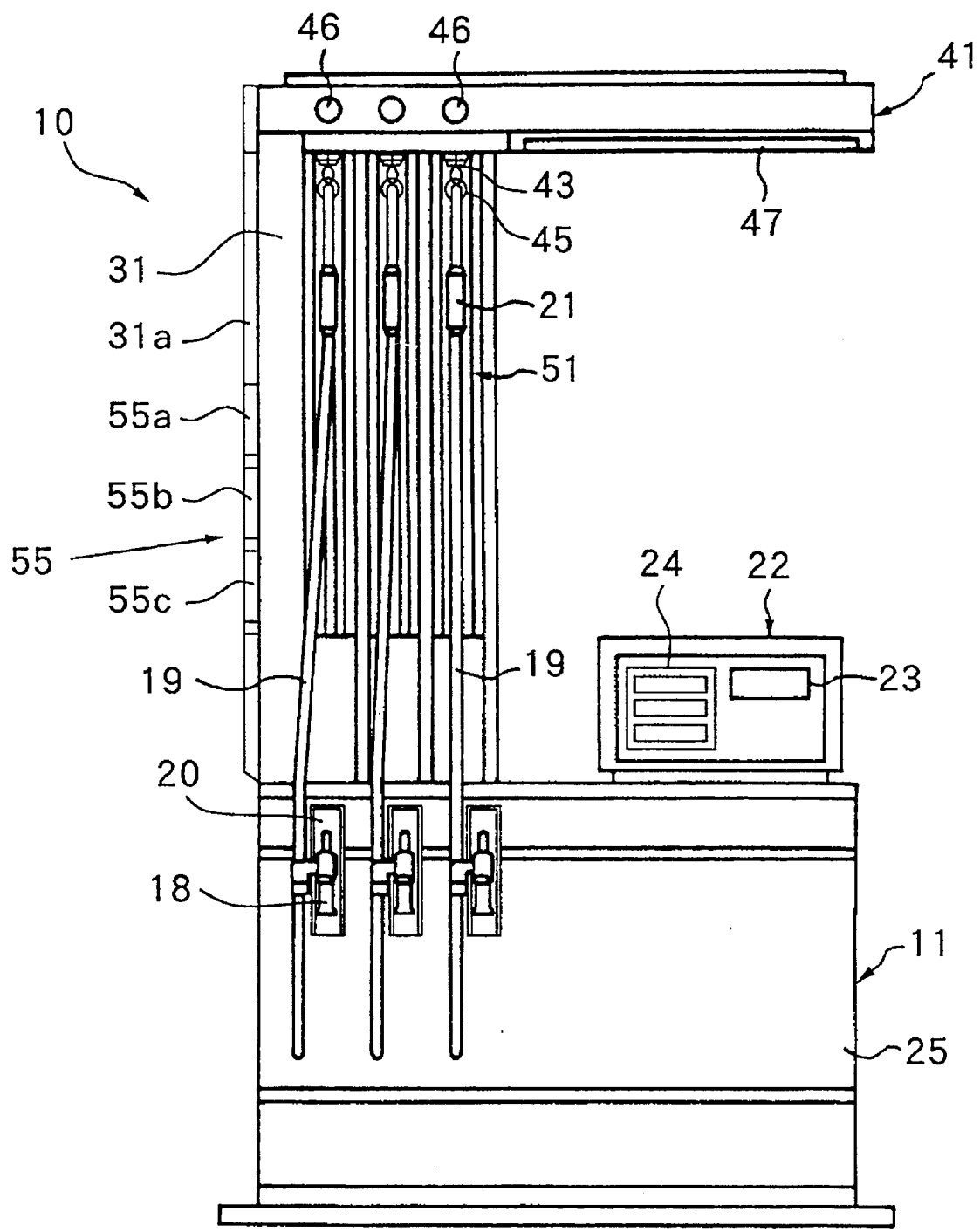
FIG. 2 is an elevation view of an embodiment of an oil-feeding apparatus according to the present invention.
Figure 3:
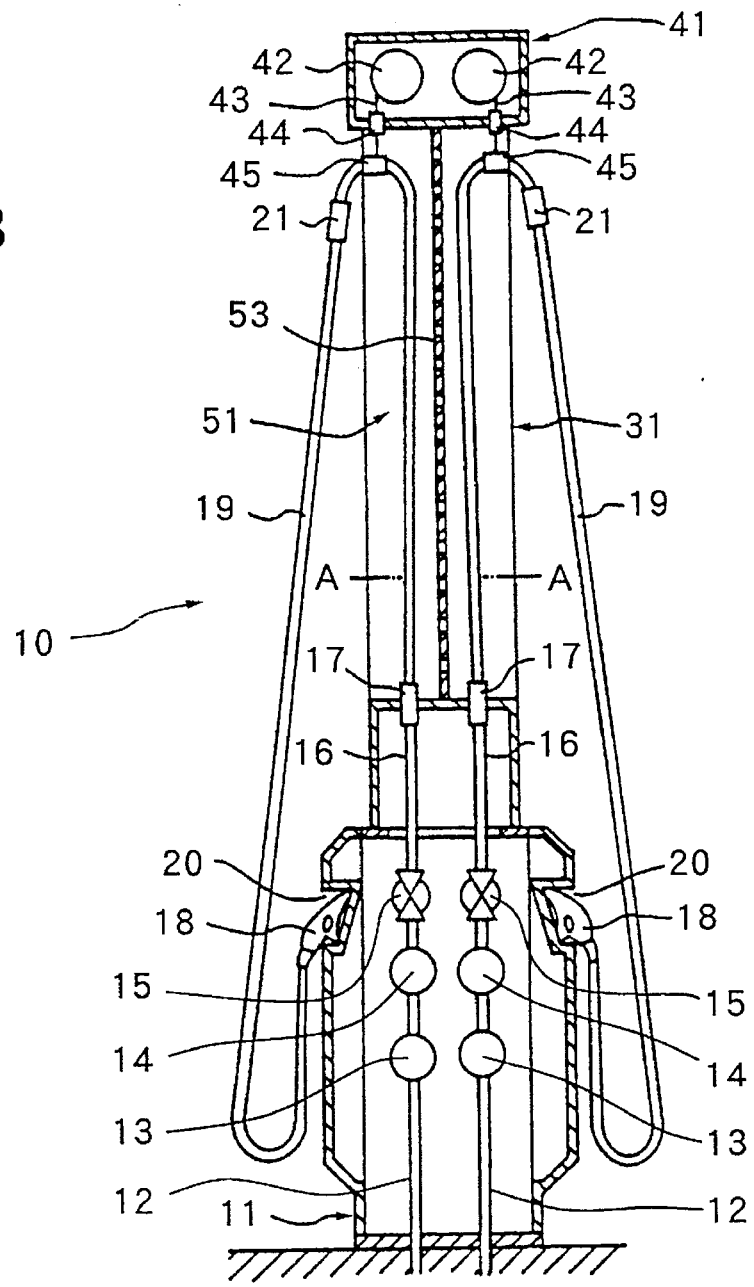
FIG. 3 is a vertical cross-sectional view of an embodiment of an oil-feeding apparatus according to the present invention.

FIG. 1 shows an external perspective view of an embodiment of an oil-feeding apparatus 10 according to the present invention, FIG. 2, an elevation view thereof, and FIG. 3, a cross-sectional view thereof. Each of them is an on-the-ground installation type oil-feeding apparatus for supplying oils such as premium gasoline, regular gasoline and diesel oil, an oil-feeding system for feeding each kind of oil is placed in a main body housing 11 of the oil-feeding apparatus 10. A strut 31 is stood at one side of the main body housing 11 and a top housing 41, containing retractors 42 (shown in FIG. 3) therein for suspending oil-feeding hoses 19 in an inverted U-shape, is connected to the top of the strut 31. A hose guide 51 used for the guidance of the oil-feeding hoses 19 is provided between the top of the main body housing 11 and the top housing 41.

The above-mentioned main body housing 11 is in the shape of a long and narrow box with respect to the transverse direction thereof. As shown in FIG. 3, six suction pipes 12 in total, 2 for each kind of oil, connected to underground tanks, rise constituting the oil-feeding system in the main body housing 11 for feeding each kind of oil. An oil-feeding pump 13, a flow meter 14, and an electrovalve 15 are connected to each of the suction pipes 12, with a discharge pipe 16 connected to each of the electrovalves 15 at the outlet side thereof. The upper ends of the discharge pipes 16 are led to the upper portion of the main body housing 11, and connected to one end of the oil-feeding hoses 19, each having an oil-feeding nozzle 18 at the tip thereof, via connectors 17.

These oil-feeding hoses 19 rise from the connectors 17 part toward the upper direction, and are suspended so as to be in the shape of inverted U with the top parts, which are the midportions of the hoses 19, supported by means of wires 43 drawn from the retractors 42 (which will be explained below) provided in the top housing 41. The oil-feeding hoses 19 are hung downward from the wire 43 toward the ground in each side of the main body housing 11, lead again upward just before the hoses 19 come in contact with the ground, and hung on nozzle rests 20 provided at both sides of the main body housing 11 as shown in FIGS. 1 to 3.

Both surfaces of the main body housing 11, as shown in FIGS. 1 and 2, are formed by use of mirror plates 25 made of a material such as polished stainless steel to increase the reflecting effect. At the upper parts of the suspended oil-feeding hoses 19, at the midportion thereof, safety pipe joints 21 are provided as shown in FIGS. 1 to 3, which are for cutting the oil-feeding hoses 19 when a pulling force is accidentally applied thereto. Moreover, an indicator housing 22 shown in FIGS. 1 and 2 is placed on the main body housing 11, on which supplied oil amount indicators 23 for showing the amount of the fed oil, and oil-kind indicating portions 24 for showing the kind of oil which is being fed, are provided at both sides thereof.

The above-mentioned strut 31 is a post with the cross-section of a rectangle shape and vertically placed along one side of the main body housing 11. The strut 31 has a side plate 31a made of opalescent acrylate resin. The side plate 31a has a display 55 for indicating the dealing products, which is composed of three colored sections 55a, 55b and 55c at the middle of the plate. For instance, the upper section 55a is green with white characters such as "PREMIUM", the middle section 55b is red with white characters "REGULAR", and the lower section 55c is blue with white characters "DIESEL". Within the strut 31, lighting equipment such as a fluorescent lamp 56 is arranged so that the ambient area is lighted thereby and the characters in the three sections are revealed.

The top housing 41 is a long and narrow box with the cross-section in the form of rectangle, one end of the top housing 41 is fixed to the top part of the strut 31, and the other end thereof is extended in the horizontal direction to the part above the main body housing 11 as can be seen from FIGS. 1 and 2.

As shown in FIG. 3, retractors 42 are contained in the top housing 41 at positions corresponding to each of the oil-feeding hoses 19. It is possible to draw wires 43 from these retractors 42 shown in FIGS. 1 to 3, to have any lengths, and the wires 43 have elastic mechanism under the application of retracting force to the pulling-in direction, for instance, by means of a spring. In addition to the above, these wires 43 are drawn downwards through wire guides 44 provided at the bottom of the top housing 41 and each end of the wires 43 is joined to a ring-shaped hose clamp 45 fixed at the inner side of the safety pipe joint 21, as shown in FIG. 3. These retractors 42 are adjusted in such a fashion that the pulling-in force of the wires 43 becomes enough for suspending each of the oil-feeding hose 19, and that the oil-feeding hoses 19 can be drawn out to have adequate lengths for use of them, opposing the pulling-in force thereof.

As can be seen from FIGS. 1 and 2, pilot lamps 46 indicating "in use" are provided on the top housing 41 at parts corresponding to the oil-feeding hoses 19 on both sides thereof. Moreover, lighting unit 47 for lighting up the oil-feeding area is provided at the horizontally extended part of the top housing 41 at the bottom thereof, so that the oil-feeding area can be preferably lit up. Each of the pilot lamps 46 for indicating "in use" has a different color depending upon the kind of oil, and the lamps go off when the oil-feeding hoses 19 are unused, and light up when any of the oil-feeding nozzles 18 is removed from the nozzle rest 20.

Figure 4:
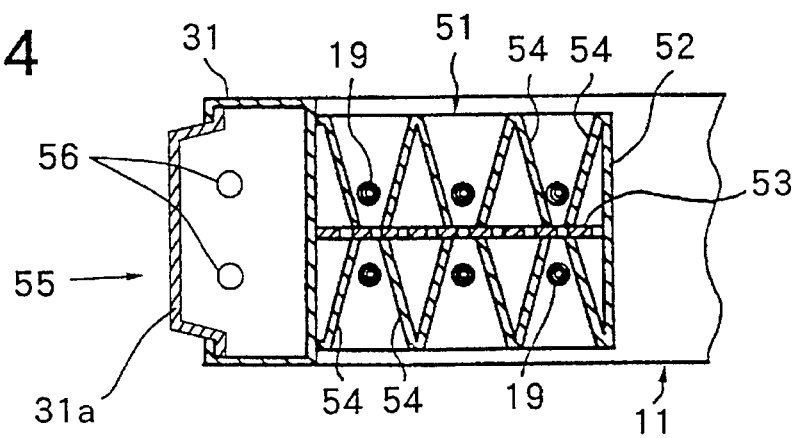
FIG. 4 is a horizontal sectional view of the oil-feeding apparatus shown in FIG. 3 cut along the line A—A in FIG. 3.

The oil-feeding apparatus of the present invention will now be explained in more detail with reference to FIG. 4, which is a horizontal sectional view of the oil-feeding apparatus shown in FIG. 3 cut along the line A—A in FIG. 3. As mentioned previously, the hose guide 51 is a part for guiding the oil-feeding hoses 19, with a part of the hose 19 suspended to form the inverted U-shape by means of the wire 43 of the retractor 42. A vertical side plate 52 is provided at a space between the top of the main body housing 11 and a bottom of the top housing 41, which corresponds to the part along which the oil-feeding hoses 19 are hung down on both sides, and a partition plate 53 (shown also in FIG. 3) made of a material such as punched metal is placed for dividing the space surrounded by the top of the main body housing 11, the bottom of the top housing 41, the side of the strut 31 and the side of the side plate 52 into two sides, and the place in which the oil-feeding hoses 19 are hung down along both sides of the partition plate 53 is divided in the vertical direction. For each oil-feeding hose 19, a pair of incline plates 54 are provided, each fastened to the partition plate 53 with the width between each pair of inclined plates 54 made larger as the parts of the plates go further from the partition plate 53. More specifically, the oil-feeding hoses 19 suspended with forming the inverted U-shape are snugly accomodated in divergent spaces partitioned by the partition plate 53 and the incline plates 54, and each of the hoses 19 can easily be drawn from the space between the two incline plates 54.

In the oil-feeding apparatus 10 with the above-mentioned structure, the oil-feeding nozzles 18 can freely be moved to a fuel inlet of a car as follows:

1. A car to which oil is supplied stops at any side of the main body housing 11 of an oil-feeding area;
2. The oil feeding nozzle 18 corresponding to the kind of oil to be supplied at the side of the car is taken out of the nozzle rest 20;
3. The oil-feeding nozzle 18 is drawn against the retracting force of the retractor 42, so that the wire 44 is drawn out;
4. The oil-feeding hose 19 in the suspended state, situated in the divergent space between a pair of inclined plates 54, is drawn out of the hose guide 51, whereby the oil-feeding nozzle 18 reaches the fuel inlet of the car.

When the oil is supplied to the car in the above state, the oil drawn up from the underground tank is discharged to a tank of the car through the oil-feeding nozzle 18 by way of the suction pipe 12, oil-feeding pump 13, flow meter 14, electrovalve 15, discharge pipe 16, and oil-feeding hose 19, and then the supplied oil amount is indicated on the supplied oil amount indicator 23 of the indicator housing 22.

Furthermore, it is possible to recognize that the required kind of oil is being supplied while oil-feeding, since the pilot lamp 46 for indicating "in use" corresponding to the kind of oil lights up, and the kind of oil is displayed on the oil-kind indicating portions 24.

With the completion of oil-feeding, the oil-feeding nozzle 18 is brought back to the nozzle rest 20, and the oil-feeding hose 19 is replaced to the space between a pair of incline plates 54 by being raised to the top housing 41 by means of the wire 43 with the retracting force of the retractor 42 applied.

As can be obvious from the above explanation, each hose 19 is separated from one another by the hose guide 51 even if a plurality oil-feeding hoses 19 are arranged side-by-side, so that the adjacent oil-feeding hoses 19 are never brought in contact or entangled with each other by use of the oil-feeding apparatus 10 according to the present invention. Moreover, the oil-feeding hoses 19 can be drawn out in a slightly slanting directions and easily replaced to the initial state from the slanting direction, since the hose guide 51 comprises the incline plates 54, two for each hose 19, with a space therebetween made wider as the parts of the plates 54 go further with respect to the partition plate 53. Thus, it is easy to handle the oil-feeding hose 19 of the oil-feeding apparatus 10 of the present invention.

In addition to the above, the oil-feeding hoses 19 for use in the present invention, suspended at the top housing 41 side by means of the wires 43 utilizing retracting force of the retractors 42, are more smoothly brought back to the initial state in comparison to conventionally employed oil-feeding hoses which are elastically held upward in the rolled state by use of elastic supports. The partition plate 53 is made of a material such as punched metal, that makes it possible to see through the partition plate 53 and to reduce the wind pressure applied to the oil-feeding apparatus 10 even when it blows strongly.

The embodiment has been explained above of the case where the hose guide 51 is provided so as to be adjacent to the strut 31, placed between the main body housing 11 and the top housing 41. The hose guide 51 can be placed at any other ways as long as it is placed between the main body housing 1i and the top housing, correspondingly to the oil-feeding hoses 19. Furthermore, the incline plates 54 can be placed in a different way from the above description as long as the hoses 19 therebetween can be drawn out in the inclining direction thereof.

The kind of oils for use in the present invention can be optionally selected without being limited to the kind of oils described above, and also the number of oil-feeding hoses is not limited to the above.

The preferred embodiment of the present invention has been explained above, which can be variously improved or modified, without departing from the intention of the present invention.

As explained above, in the present invention, the oil-feeding hoses can be easily handled by being smoothly taken in and out under the guidance of the hose guide even when a plurality of hoses are placed side-by-side, and being smoothly brought back to the initial state.

What is claimed is:

1. An oil-feeding apparatus comprising:
   a main body housing containing a plurality of oil-feeding pumps and a plurality of flow meters therein;
   an indicator housing placed on said main body housing having supplied oil amount indicators;
   a strut stood at one side of said main body housing;
   a top housing with one end connected to the top of said strut, and the other end extended to a part above said main body housing;
   a hose guide provided between said main body housing and said top housing;
   oil-feeding hoses, each with an oil-feeding nozzle at a free end thereof, the other end being connected to a discharge pipe provided at the outlet side of a respective one of said flow meters at a lower part of said hose guide;
   retractors provided in said top housing;
   wires drawn from said retractors, the midportion of each of said hoses being fastened by means of said wires so as to be suspended in an inverted U-shape in said hose guide; and
   nozzle rests provided on said main body housing for hanging said oil-feeding nozzles on the free ends of said oil-feeding hoses.

2. The oil-feeding apparatus as claimed in claim 1, wherein said oil-feeding hoses are provided at both sides of said main body housing, and said supplied oil amount indicators are provided at both sides of said indicator housing.

3. The oil-feeding apparatus as claimed in claim 1, wherein said oil-feeding hoses are composed of three hoses respectively for feeding premium gasoline, regular gasoline and diesel oil.

4. The oil-feeding apparatus as claimed in claim 1, further comprising a lighting unit for lighting up an oil-feeding area, said lighting unit being provided in said top housing on the bottom of an extended part thereof above said main body housing.

5. The oil-feeding apparatus as claimed in claim 1, further comprising pilot lamps for indicating "in use" provided at the sides of said top housing above said hose guide, the positions of said pilot lamps corresponding to those of said oil-feeding hoses.

6. The oil-feeding apparatus as claimed in claim 2, wherein said hose guide comprises a partition plate made of punched metal for dividing the area above said main body housing into two sides.

7. The oil-feeding apparatus as claimed in claim 6, further comprising a pair of incline plates for each of said oil-feeding hoses, said incline plates fixed to said partition plate with the width between each pair of said incline plates made larger as the parts thereof go further from the partition plate so as to form a divergent vertical space for snugly accommodating each one of the hoses.

8. The oil-feeding apparatus as claimed in claim 2, wherein both sides of said main body housing are made of mirror plates.

9. The oil-feeding apparatus as claimed in claim 1, wherein the strut has a side plate on which a display for indicating dealing products is provided.

* * * * *